(12) United States Patent
Han et al.

(10) Patent No.: US 9,804,898 B2
(45) Date of Patent: Oct. 31, 2017

(54) METHOD AND APPARATUS FOR PROCESSING APPLICATIONS OF MOBILE TERMINAL

(71) Applicant: Samsung Electronics Co. Ltd., Suwon-si, Gyeonggi-do (KR)

(72) Inventors: Kyunghoon Han, Seoul (KR);
Kyungmin Kim, Seoul (KR);
Chaekyung Lee, Seoul (KR);
Youngsun Shin, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/037,941

(22) Filed: Sep. 26, 2013

(65) Prior Publication Data

US 2014/0089947 A1   Mar. 27, 2014

(30) Foreign Application Priority Data

Sep. 26, 2012   (KR) ........................ 10-2012-0106914

(51) Int. Cl.
| | | |
|---|---|---|
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |
| G06F 9/48 | (2006.01) |
| G06F 3/048 | (2013.01) |
| G06F 9/445 | (2006.01) |

(52) U.S. Cl.
CPC ................ *G06F 9/54* (2013.01); *G06F 3/048* (2013.01); *G06F 9/4443* (2013.01); *G06F 9/44505* (2013.01); *G06F 9/44526* (2013.01); *G06F 9/461* (2013.01); *G06F 9/48* (2013.01)

(58) Field of Classification Search
CPC ........................................................ G06F 9/54
USPC ........................................................ 719/328
See application file for complete search history.

(56) References Cited

FOREIGN PATENT DOCUMENTS

KR   10-2010-0054601 A   5/2010

OTHER PUBLICATIONS

"Samsung Galaxy Note 10.1 Has Arrived; Game-Changing Device Hits U.S. Store Shelves Tomorrow" published on Samsung.com on Aug. 15, 2012, 5 pages.*

(Continued)

*Primary Examiner* — Timothy A Mudrick
(74) *Attorney, Agent, or Firm* — Jefferson IP Law, LLP

(57) ABSTRACT

A method for processing an application in a portable terminal is provided. The method includes displaying a main application and at least one corresponding sub-application item, calling a corresponding sub-application when selecting the sub-application item, displaying the sub-application so as to overlay on a partial area of a main application screen, and processing information selected from the main application in the sub-application.

19 Claims, 19 Drawing Sheets

(56) References Cited

OTHER PUBLICATIONS

"Samsung Galaxy Note 10.1—Android Tablet-User Manual", Samsung's user manuals, Aug. 21, 2012, pp. 1-249, XP055117806.
Andrew Vacca, "Samsung Galaxy Note 10.1 review", Aug. 22, 2012, pp. 1-13, XP055117824.
Joseph Volpe, "Samsung Galaxy Note 10.1 review", Sep. 15, 2012, pp. 1-17, XP055117394.
GSMARENA Team, "Samsung Galaxy Note 10.1 review", Aug. 24, 2012, pp. 1-32, XP055117577.
"Ez PDF Reader User Guide v.01 based on iPad Version 1.9", Unidocs Inc. user guides, Jun. 29, 2011, pp. 1-13, XP055117215.
"Menus Android Developers", Feb. 2, 2012, pp. 1-16, XP055117182.

* cited by examiner

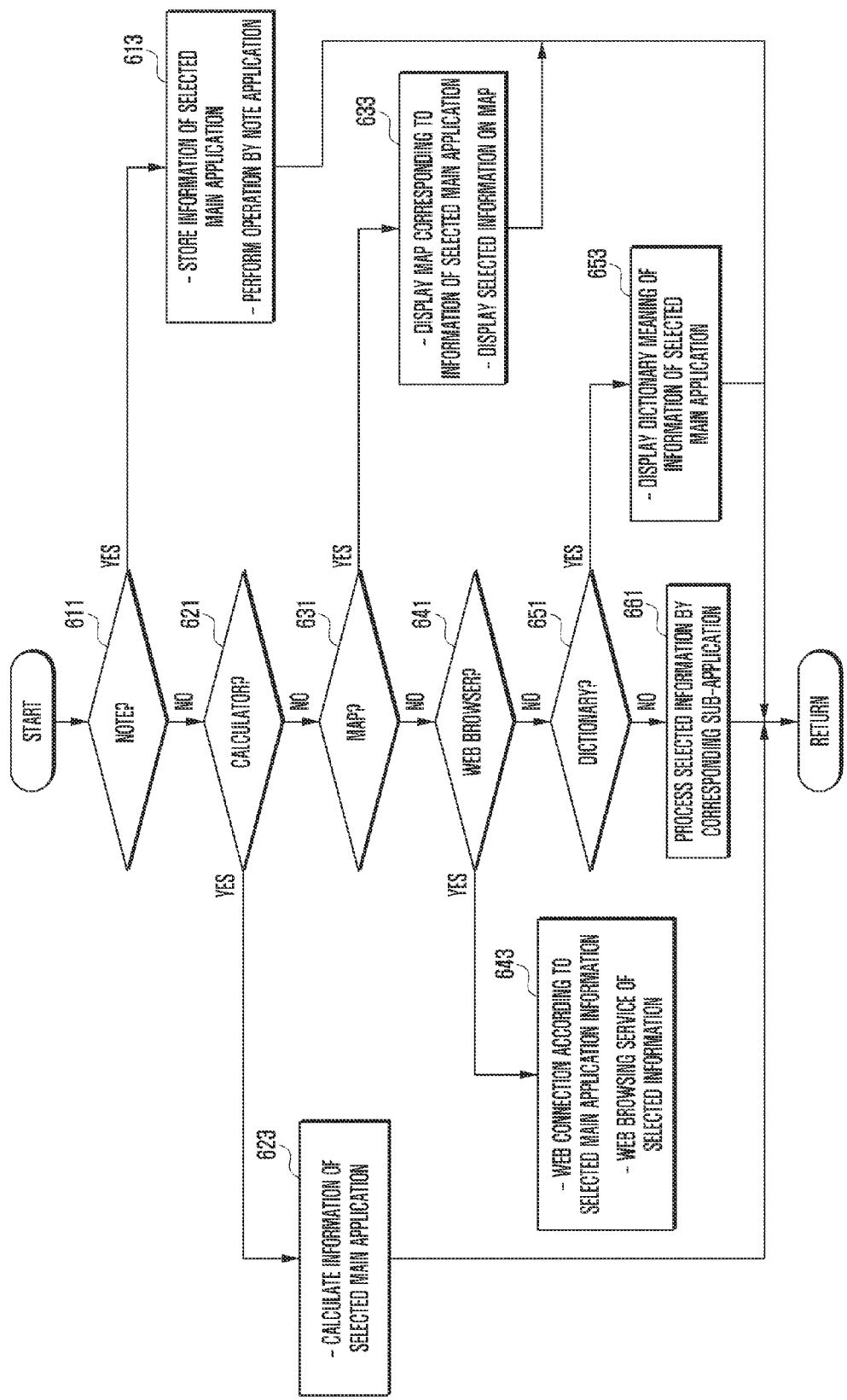

FIG. 7A
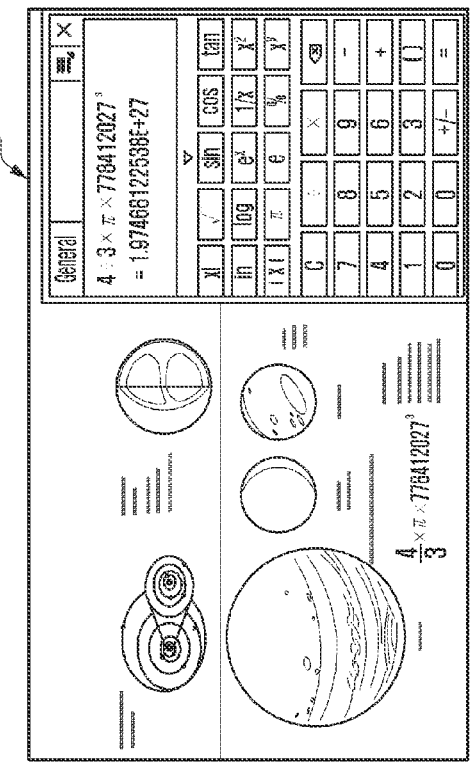
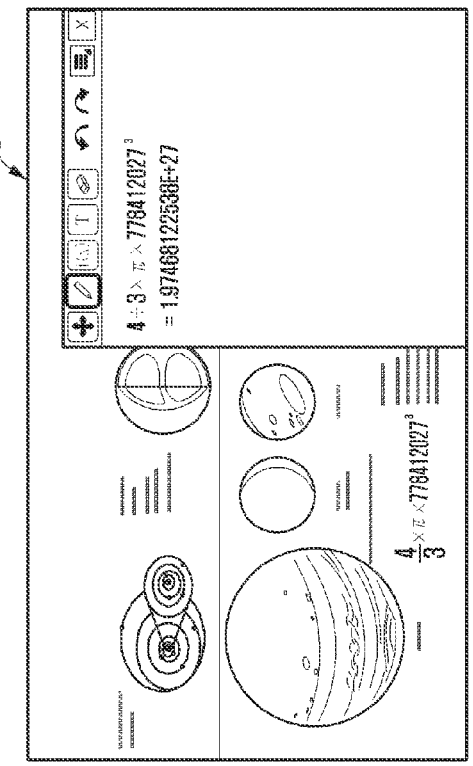
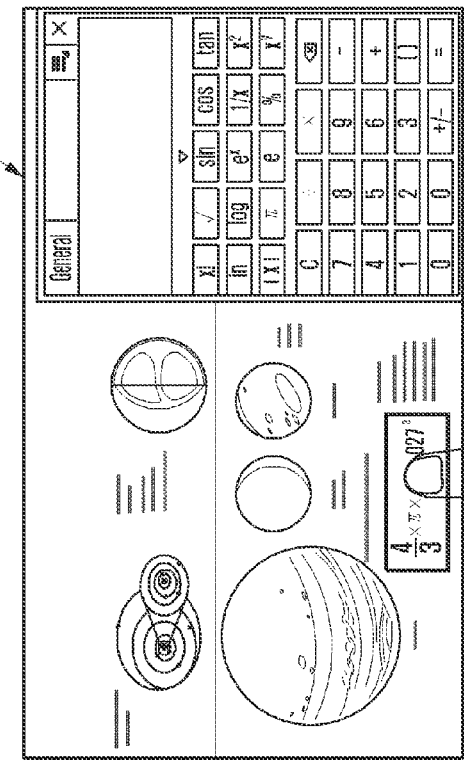

FIG. 7B
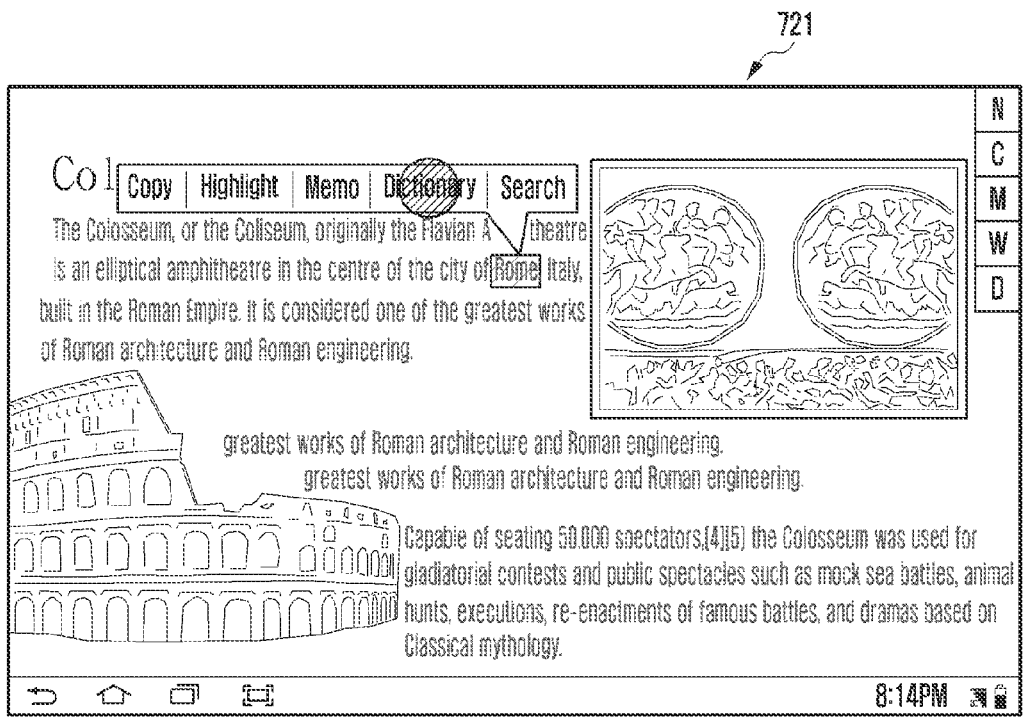
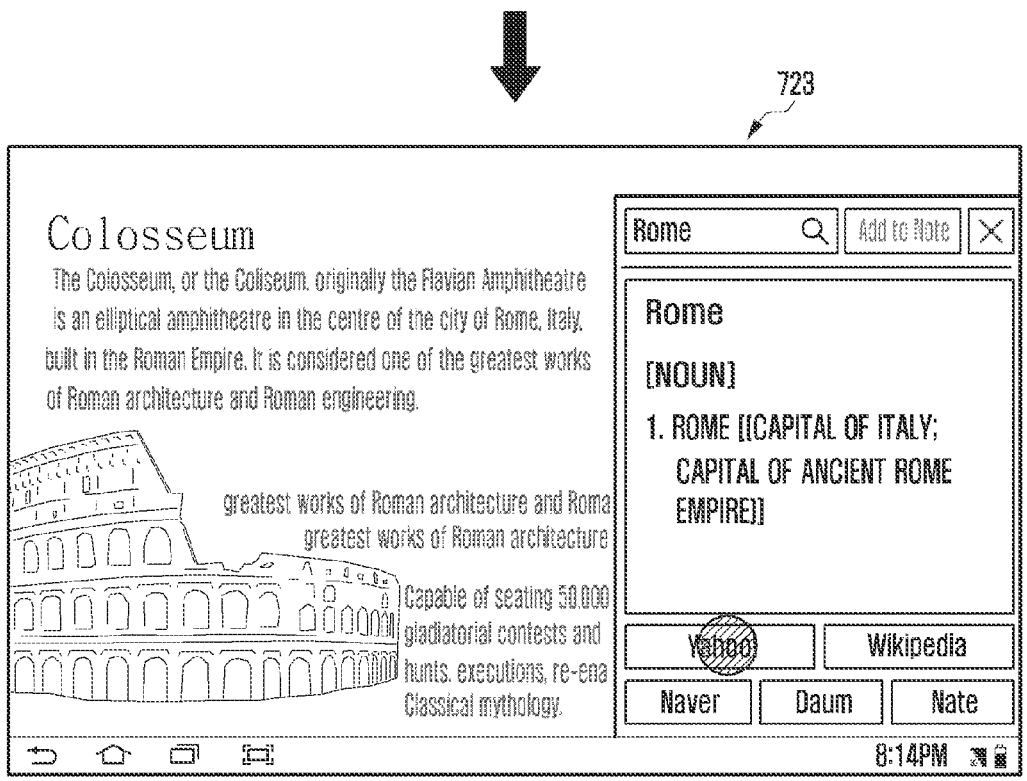

FIG. 7D
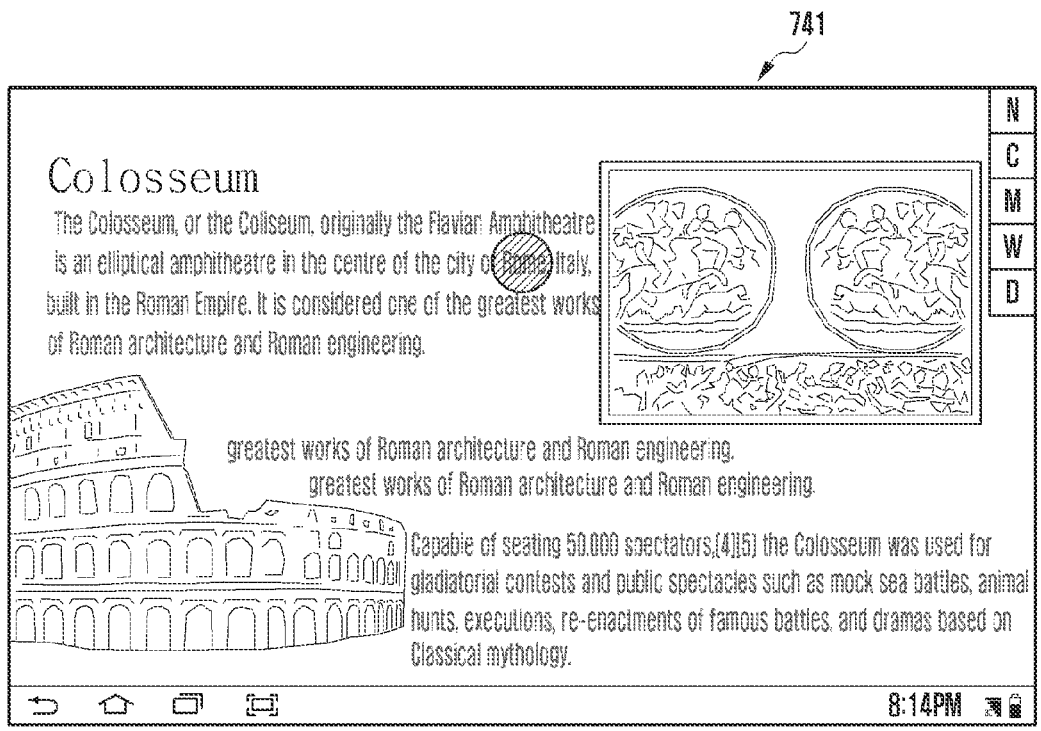
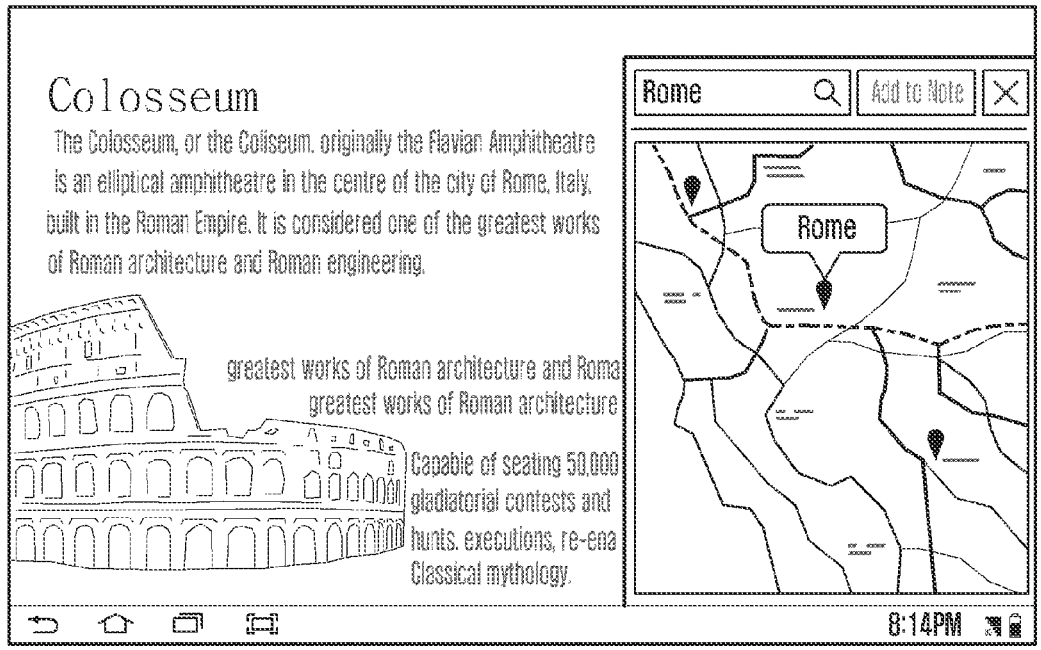

FIG. 7E
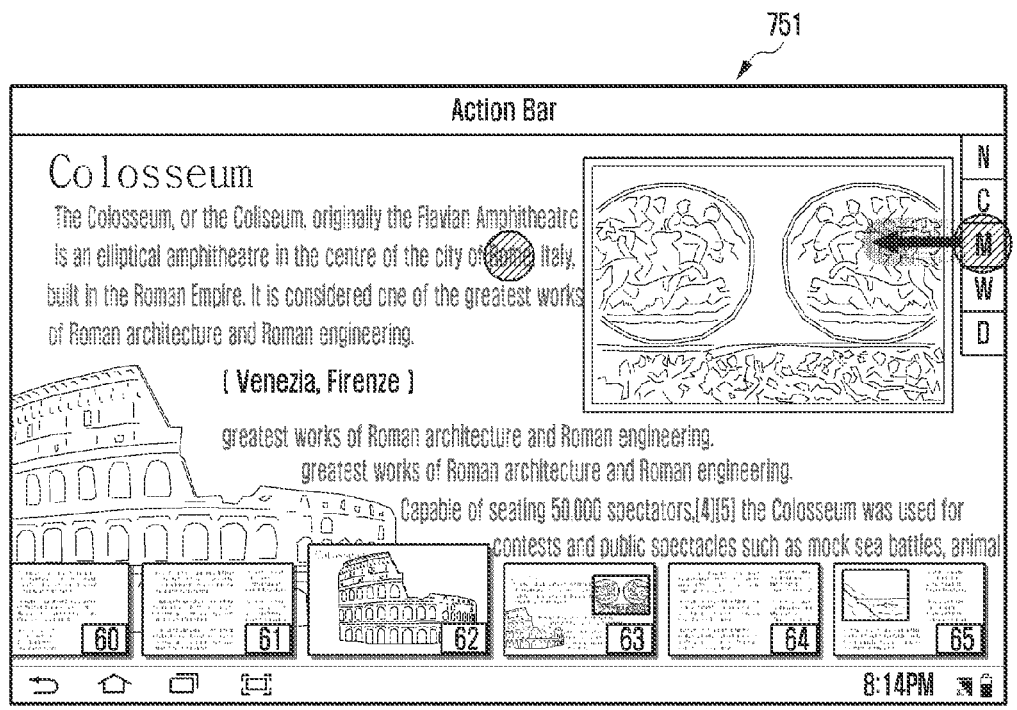
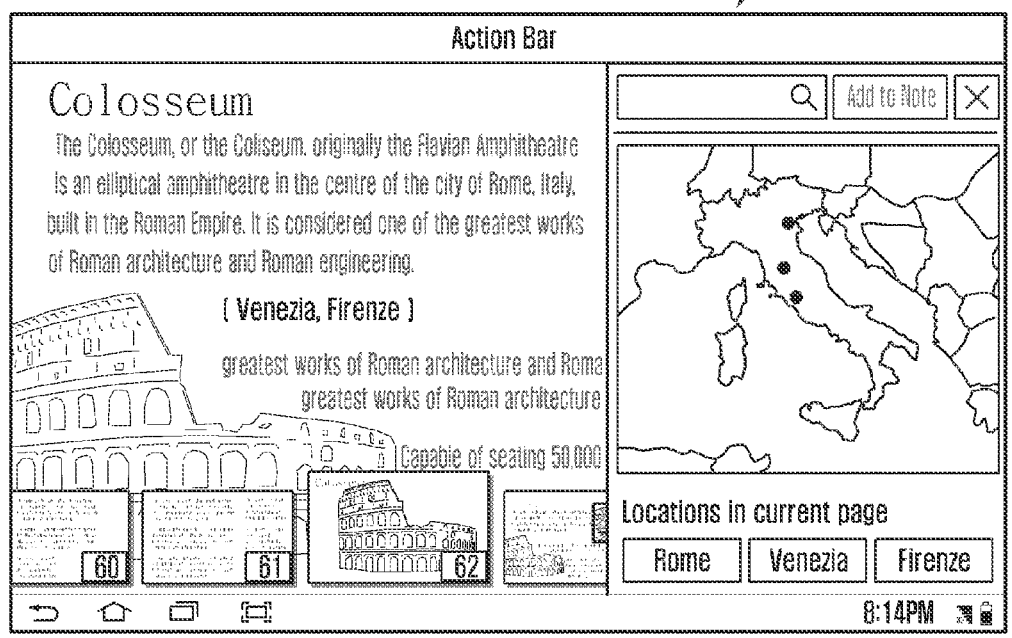

FIG. 7F
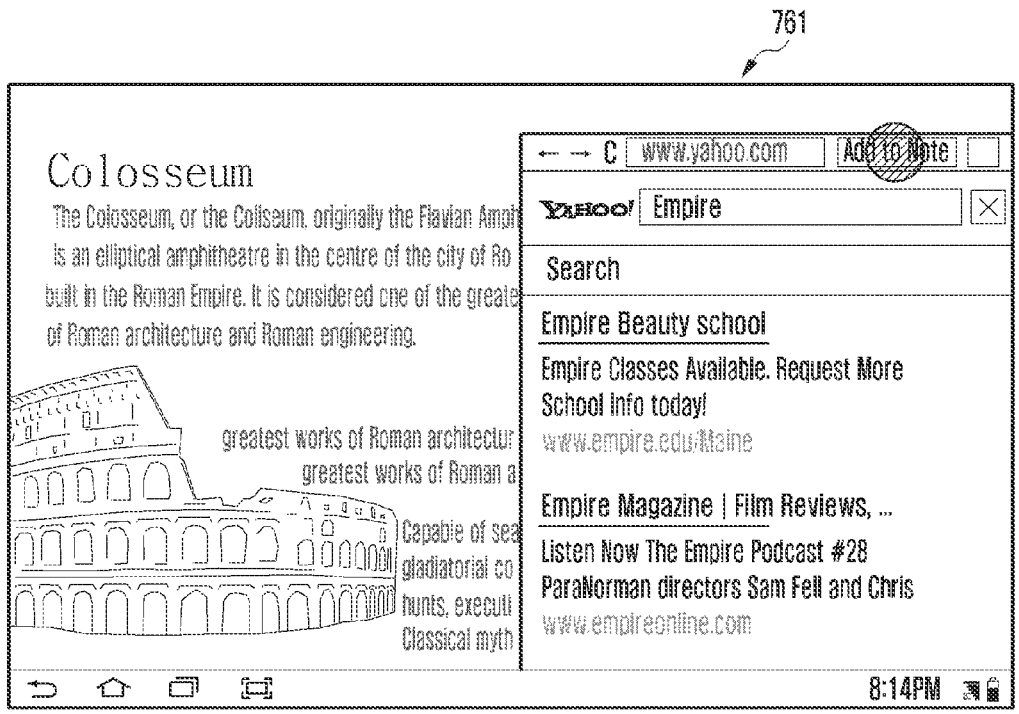
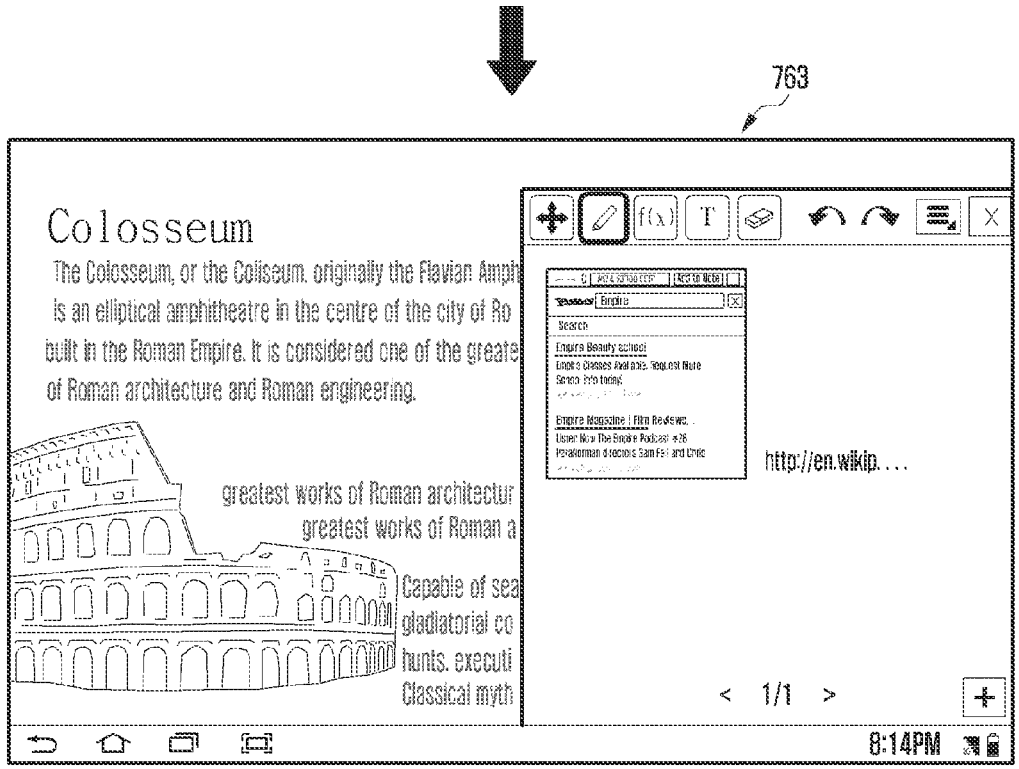

METHOD AND APPARATUS FOR PROCESSING APPLICATIONS OF MOBILE TERMINAL

CROSS-REFERENCE TO RELATED APPLICATIONS

This application claims the benefit under 35 U.S.C. §119(a) of a Korean patent application filed on Sep. 26, 2012 in the Korean Intellectual Property Office and assigned Serial No. 10-2012-0106914, the entire disclosure of which is hereby incorporated by reference.

TECHNICAL FIELD

The present disclosure relates to a method and apparatus for processing applications of a portable terminal More particularly, the present disclosure relates to a method and apparatus for linkage between a main application and a sub-application.

BACKGROUND

When performing an application, a portable terminal uses a sub-application of an additional function for performing the application. In the current technology, the following methods are used to add additional functions to a main application.

One of the methods is a method of including an additional application in a main application. For example, when an additional function is needed in the main application, the additional function is set to be included in the main application. Such a method makes the linkage between the additional function and the main application easy. However, the main application gets complicated as the number of additional applications increases. For example, in the case of a readers hub viewer application, the dictionary function of the additional function is mounted on the viewer application, and thus a previous search result of words selected from the eBook content may be shown. Further, even when the additional function included in the main application is an additional function that may be commonly used in various applications, the additional function may be independently repeated for each application.

Another method is a method of providing additional functions needed for various main applications in a form of a small pop-up window. Such a method may commonly use additional functions provided as a mini application. However, the mini application is provided in a form that is completely separated from the main application, and thus the linkage between the main application and the mini application is restricted.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for linkage between a main application and sub-applications.

In accordance with an aspect of the present disclosure, a method for processing an application in a portable terminal is provided. The method includes displaying a main application and at least one corresponding sub-application item, calling a corresponding sub-application when selecting the sub-application item, displaying the sub-application so as to overlay on a partial area of a main application screen, and processing information selected from the main application in the sub-application.

In accordance with another aspect of the present disclosure, a method for processing an application of a portable terminal is provided. The method includes displaying a main application and a plurality of corresponding sub-application items, calling a corresponding sub-application when selecting the sub-application item, displaying the sub-application so as to overlay on a partial area of a main application screen, processing information selected from the main application in the sub-application, and returning to an operation of displaying the main application and the plurality of corresponding sub-application items when the sub-application is terminated.

In accordance with another aspect of the present disclosure, an apparatus for processing an application in a portable terminal is provided. The apparatus includes a memory that stores a main application and a sub-application set corresponding to the main application, a display unit that displays the main application and sub-application items which are set in the corresponding sub-application set of the main application, an input unit that selects the sub-application items, and a controller that controls to call a corresponding sub-application and to display the sub-application so as to overlay on a partial area of the main application screen when selecting the corresponding sub-application item of the main application, and processes information selected from the main application in the sub-application.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 illustrates a linkage operation between a main application and a sub-application such as, for example, the main application and the sub-application of FIG. 5, according to an embodiment of the present disclosure;

FIGS. 7A to 7F illustrate an operation of each sub-application in a process of performing a procedure such as, for example, the procedure of FIG. 6 according to an embodiment of the present disclosure;

Throughout the drawings, it should be noted that like reference numbers are used to depict the same or similar elements, features, and structures.

DETAILED DESCRIPTION

Figure 1:
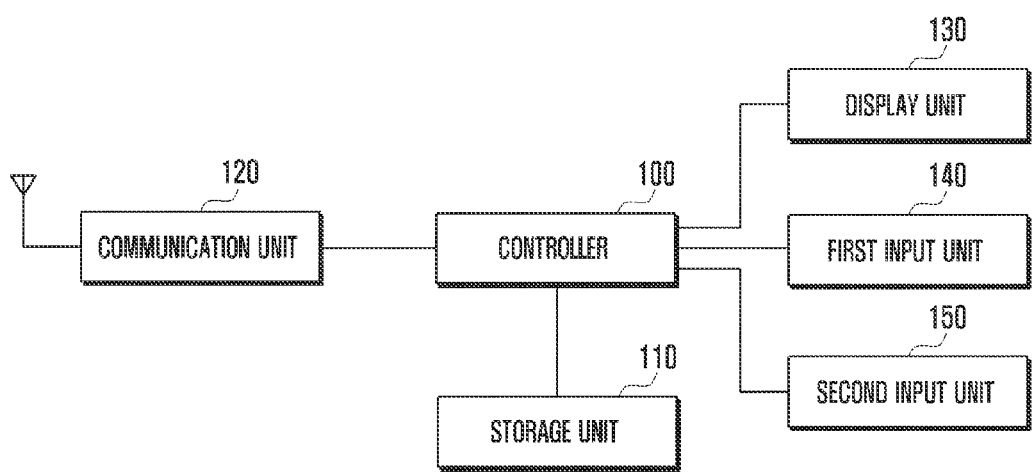
FIG. 1 illustrates a configuration of a portable terminal according to an embodiment of the present disclosure.

The following description with reference to the accompanying drawings is provided to assist in a comprehensive understanding of embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a", "an", and "the" include plural referents unless the context clearly dictates otherwise. Thus, for example, reference to "a component surface" includes references to one or more of such surfaces.

The present disclosure sets the sub-applications of additional functions performed in the main application as a tool kit frame, displays sub-applications that may be used at the time of executing the main application as items, and overlay-displays the sub-application of the additional function corresponding to the item when a user selects the item on the screen of the main application. For example, if the user executes a main application to perform the main task, the portable terminal according to an embodiment of the present disclosure displays the main application on the entire screen area, and displays sub-application items of the additional function, which may be used in the main application, at a certain position of the screen area. The user of the portable terminal may call the sub-application (sub task) by pushing or dragging the sub-application item (may be configured as a button of a tab type) which is displayed at a certain location of the screen, and the sub-application (hereinafter, a toolkit) is displayed in a form that is overlaid on the main application.

According to various embodiments, the portable terminal may be various digital devices such as a mobile phone, an MP3 terminal, a tablet Personal Computer (PC), a Personal Digital Assistant (PDA), a digital camera, a portable game console, a Portable/Personal Multimedia Player (PMP), a handheld e-book, a laptop PC, a Global Positioning System (GPS) navigation, a desktop PC, a high definition television (HDTV), an optical disc player, and the like.

In the description below, the main application and the main task are the same, and the sub-application, the sub-task and the toolkit are the same.

FIG. 1 illustrates a configuration of a portable terminal according to an embodiment of the present disclosure.

Referring to FIG. 1, the portable terminal includes a controller 100, a memory 110, a communication unit 120, a display unit 130, a first input unit 140, and a second input unit 150.

The communication unit 120 performs a wireless communication function with a base station or another device. The communication unit 120 may include a transmission unit that up-converts the frequency of the transmitted signal and amplifies power, and a reception unit that low-noise-amplifies the received signal and that down-converts the frequency. Further, the communication unit 120 may include a modulation unit and a demodulation unit. The modulation unit modulates the transmitted signal and transmits the signal to the transmission unit, and the demodulation unit demodulates the signal received through the reception unit. The modulation and demodulation unit may be configured for communication using Long Term Evolution (LTE), Wideband Code Division Multiple Access (WCDMA), Global System for Mobile Communications (GSM), WIFI, WIBRO, Near Field Communication (NFC), Bluetooth, and the like. It is assumed that according to various embodiments of the present disclosure that the communication unit 120 includes LTE, WIFI, and Bluetooth communication units.

The controller 100 controls overall operation of the portable terminal, displays items of the corresponding sub-applications at the time of execution of the main application according to various embodiments of the present disclosure, and overlays the sub-application corresponding to the selected item on the main application screen so as to control the linkage operation between the main application and the sub-application.

A memory 110 may include a program memory that stores an operation program of a terminal and a program according to various embodiments of the present disclosure, and a data memory that stores tables for operation of a terminal and data generated during the execution of a program. Further, the memory 110 stores a main application and a sub-application set corresponding to the main application. According to various embodiments, the sub-application set may be commonly used in a plurality of main applications. The sub-application set (e.g., toolkit set) corresponds to a set including applications for performing the additional function of the corresponding main application. According to various embodiments, the sub-application set may include a note application, a map application, a web application, a calculator application, a dictionary application, and the like, or a combination thereof.

The display unit 130 displays information of the application under execution under control of the controller 100. As an example, the display unit 130 may be a Liquid Crystal Display (LCD), an Organic Light Emitting Diode (OLED) display, or the like.

The first input unit 140 may be implemented as a capacitance type, a resistive type, or the like, or a combination thereof. The first input unit 140 outputs the location information of the user's touch (hereinafter, assumed as a finger touch) to the controller 100.

The second input unit 150 may include an EMR sensor pad, or the like. The second input unit 150 detects a pen touch input and outputs the pen touch input to the controller 100.

According to various embodiments, the display unit 130, the touch panel 140 and the EMR panel 150 may be integrally constituted.

Figure 2A:
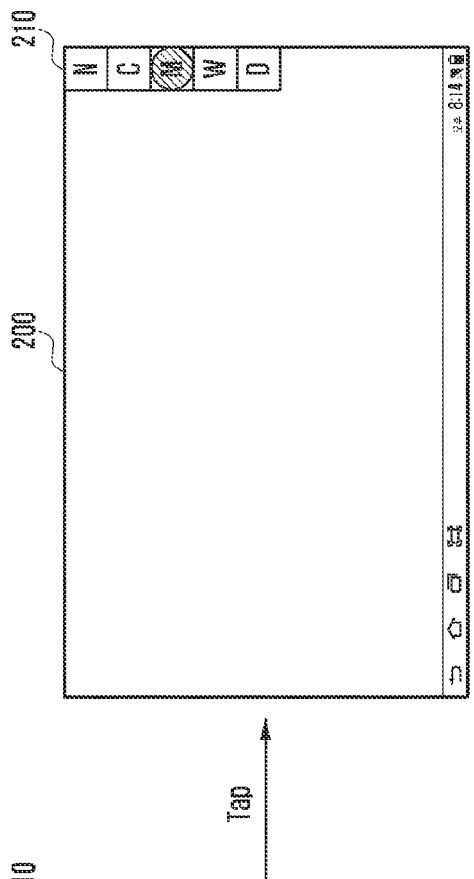
FIGS. 2A to 2C illustrate a linkage operation between a main application and a sub-application in a portable terminal according to an embodiment of the present disclosure.
Figure 2B:
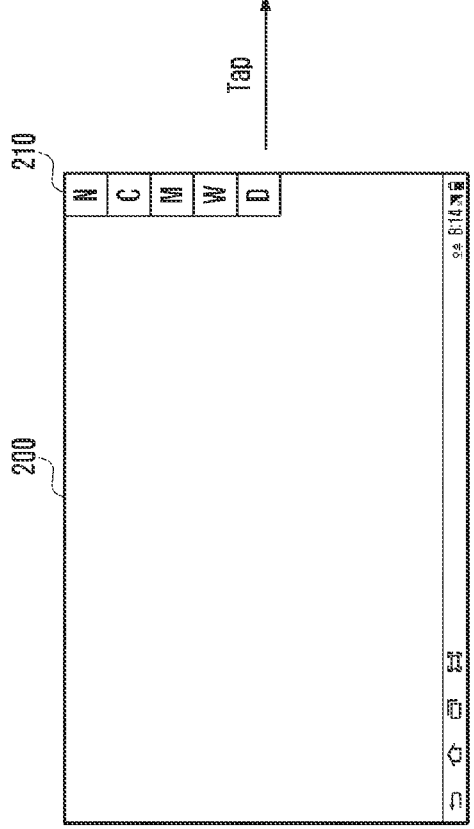
Figure 2C:
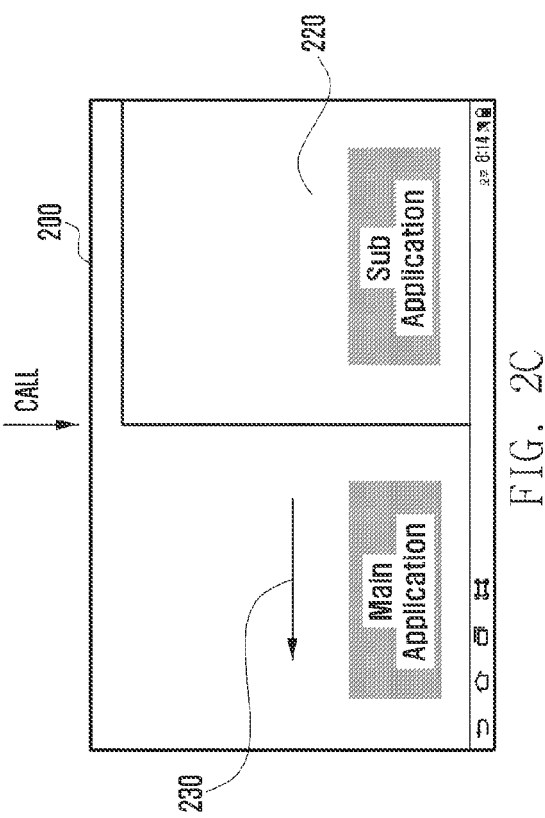

FIGS. 2A to 2C illustrate a linkage operation between a main application and a sub-application in a portable terminal according to an embodiment of the present disclosure.

Referring to FIGS. 2A to 2C, the basic configuration of the present disclosure includes a main application 200 by which a user directly reads content, and a sub-application 220 providing an additional function for re-processing information such as recording or handwriting an object or text of the main application 200. Accordingly, the main application 200 and the sub-application of the additional function have a mutually close relation.

According to various embodiments of the present disclosure, as illustrated in FIG. 2A, the controller 100 displays the sub-application item 210 which provides an indication of a usable additional function in the screen of the main application at the time of execution of the main application. According to various embodiments, at least one sub-application item 210 may be provided. In FIG. 2A, sub-application items 210 are provided. Referring to FIG. 2A, "N" may denote a note application item, "C" may denote a calculator application item, "M" may denote a map application item, "W" may denote a web browser application item, and "D" may denote a dictionary application item.

According to various embodiments, a sub-application item may be selected. For example, as illustrated in FIG. 2B, sub-application corresponding to "M" may be selected.

As illustrated in FIG. 2C, according to various embodiments, if a certain sub-application item is selected, the controller 100 overlays the corresponding sub-application on the main. The sub-application 220 is overlaid on the screen of the main application 200. The controller 100 may regulate the transparency of the sub-application screen. For example, it is assumed that the transparency is 0, and in this case, the main application of the area overlaid in the sub-application 220 is not displayed. Likewise, when the sub-application is overlaid on the main application 200, the display unit 130 should be able to display the main application of the area covered by the sub-application. To this end, when the sub-application 220 is overlaid on the main application 200 as illustrated in FIG. 2C, if a drag (or scroll) occurs in the area in which the main application 200 is displayed, the screen of the main application 200 may be moved by the drag. As an example, the drag operation may be performed by a touch or gesture (e.g., a hovering) of a hand (e.g., a finger) sensed (e.g., detected) in the first input unit 140 or a pen sensed in the second input unit 150. According to various embodiments, if the drag operation is sensed through the first input unit 140 or the second input unit 150 as in screen 230 in a state in which the main application and the sub-application are overlaid as in FIG. 2C, the controller 100 moves the screen of the main application in a direction along which a drag operation has occurred (e.g., in the case of FIG. 2C, a horizontal direction from right to left). Further, when the main application exceeds a preset size (e.g., 50% of the main application screen page) by the drag operation, the page of the main application may be changed and displayed. The preset size may be selectively configured (e.g., by a user or applications designer). For example, the user may select the preset size according to individual preferences. The preset size may be a universal variable that applies to all main applications, or the preset size may be configured on a more granular level so as to apply to a specific main application or a subset of main applications.

For example, it is assumed in FIG. 2C that the main application 200 is an e-book application, and the sub-application 220 is a dictionary application. In such a case, if the item D of the dictionary application is selected (e.g., from the provided sub-application items 210), the controller 100 recognizes (e.g., determines) that the dictionary application of the additional function is an open state (e.g., that the dictionary application is activated). If a user scrolls (or drags) the main application so as to allow a temporary page drag at the time of a page search, then the controller 100 drags the page (e.g., an e-book page) of the main application covered by the dictionary application display area of the additional function so that contents may be searched. If the sub-application of the additional function is at a close state (e.g., if the sub-application is not activated), the controller 100 recognizes the close state of the sub-application so that the scroll (or drag) function of the main application is not supported. In such a case, the controller 100 may support a flick function of the main application.

According to various embodiments, when the main application area is covered by the display of the sub-application of the additional function, the controller 100 allows a temporary vertical and horizontal scroll of the main application area so that the covered area of the main application may be searched by panning without closing the display of the sub-application.

According to various embodiments, if the scroll (or drag) is performed by more than a certain range in the display area of the main application, the controller 100 moves the page of the displayed main application to another page without closing the sub-application.

According to various embodiments, when reaching the last page of the content of the main application by continually moving the page in a state in which the sub-application is opened, the last page may be indicated by providing a special effect. For example, the last page may be indicated by providing a lighting effect.

According to various embodiments, in a state in which the content page of the main application covered by the display of the sub-application is being viewed (e.g., as illustrated in FIG. 2C), if the user closes the display of the sub-application using the first input unit 140 or the second input unit 150, the main application is displayed as illustrated in FIG. 2A, and the displayed page of the main application returns to the page that occupies the area of more than 50%. For example, if the user closes the sub-application, the main applications returns to a display setting used before the sub-application was opened (activated).

Likewise, in the screen of the portable terminal according to an embodiment of the present disclosure, the main application screen and the sub-application screen are overlaid, and at this time, the sub-application may be formed of a plurality of toolkits.

Figure 3A:
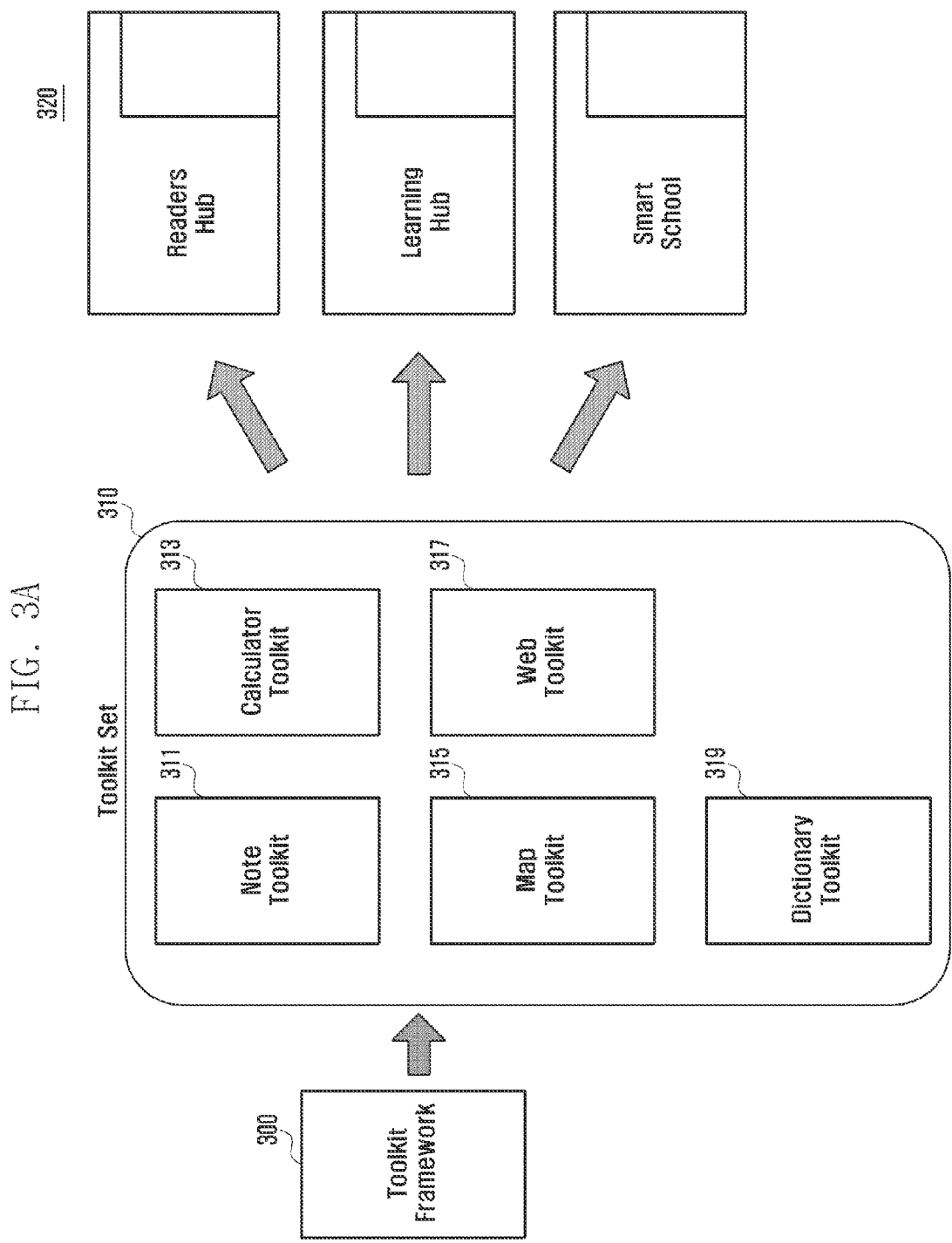
FIG. 3A illustrates a configuration of a sub-application set (toolkit set) in a portable terminal according to an embodiment of the present disclosure.
Figure 3B:
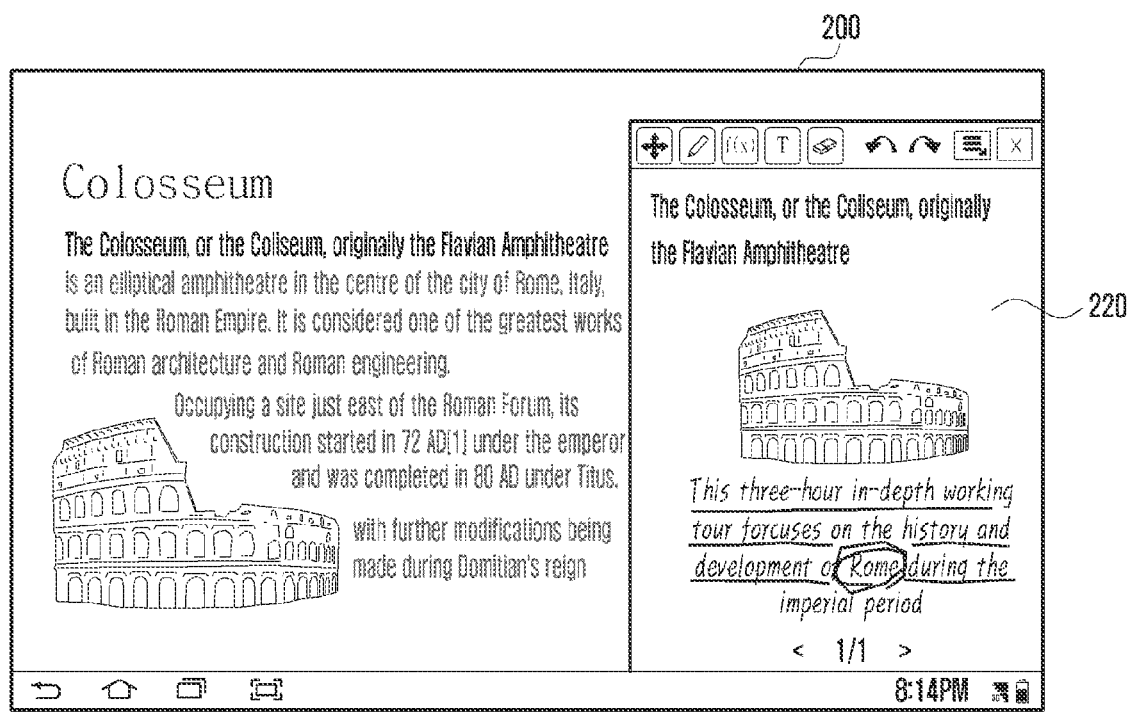
FIG. 3B illustrates a configuration of a main application and a sub-application in a portable terminal according to an embodiment of the present disclosure.

FIG. 3A illustrates a configuration of a sub-application set (toolkit set) in a portable terminal according to an embodiment of the present disclosure. FIG. 3B illustrates a configuration of a main application and a sub-application in a portable terminal according to an embodiment of the present disclosure.

Referring to FIG. 3A, the sub-application may be implemented on the basis of the toolkit framework 300. As an example, the toolkit framework 300 provides a screen configuration between the sub-application and the main application. Further, the toolkit framework 300 provides common functions for the data exchange scheme. In the sub-application, the toolkits implemented based on the toolkit framework 300 are provided as a toolkit set 310. The toolkit set 310 (sub-application set) may be commonly used in relation to various main applications. Further, each main application may differently provide the toolkit type included in the toolkit set according to characteristics. According to various embodiments, the user may customize the configuration of the toolkit type.

As illustrated in FIG. 3A, the sub-application (toolkit) may include the note application 311, the calculator application 313, the map application 315, the web browser application 317, the dictionary application 319, and the like. The toolkit set 310 may be implemented (deployed) in various contexts 320 such as for example, in a reader's hub, a learning hub, a smart school, and the like.

Referring to FIG. 3B, a screen configuration of the display unit 130 when selecting the note application as the sub-application 220 is provided. As illustrated in FIG. 3B, the sub-application 220 is provided in the context of the main application 200 being the e-book application. According to various embodiments, the sub-application 220 may display information selected in the main application 200. According to various embodiments, the sub-application 220 may add information inputted by user.

Figure 4:
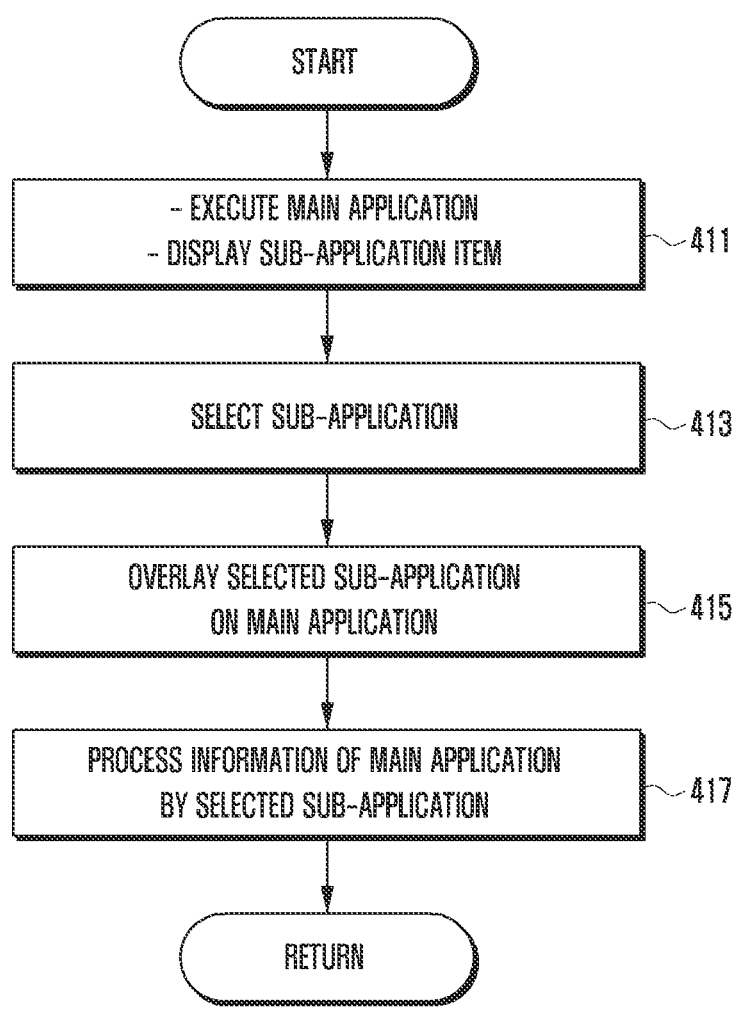
FIG. 4 is a flowchart illustrating a procedure of linking a main application and a sub-application in a portable terminal according to an embodiment of the present disclosure.

FIG. 4 is a flowchart illustrating a procedure of linking a main application and a sub-application in a portable terminal according to an embodiment of the present disclosure.

Referring to FIG. 4, at operation 411, if the user executes a certain application, the controller 100 detects the execution (or request therefor), and displays the application in the display unit 130 as the main application. At this time, the controller 100 displays the item of the sub-applications, which is the additional function of the main application along with the main application on the display unit 130.

At operation 413, the controller 100 detects selection of a sub-application item. For example, in a state as illustrated in FIG. 2A, if the user selects the sub-application item as in FIG. 2B, then the controller 100 detects the selection.

At operation 415, the controller 100 displays the sub-application that is overlaid on the main application as illustrated in FIG. 2C. For example, when the controller 100 detects that the user selects the sub-application item, controller 100 displays the sub-application so as to be overlaid on the main application.

Thereafter, at operation 417, the controller 100 processes the information of the main application selected by user through the sub-application of the additional function. For example, if the selected sub-application is the note application, the controller 100 displays the information of the selected main application on the sub-application screen, and displays together the information inputted through the first input unit 140 or the second input unit 150. As another example, if the application is a calculator application, the controller 100 calculates the information of the selected main application. As another example, if the application is a web application, the information of the selected main application is searched through the web. As another example, if the application is a dictionary application, the meaning of the information of the selected main application is displayed in the sub-application.

Figure 5:
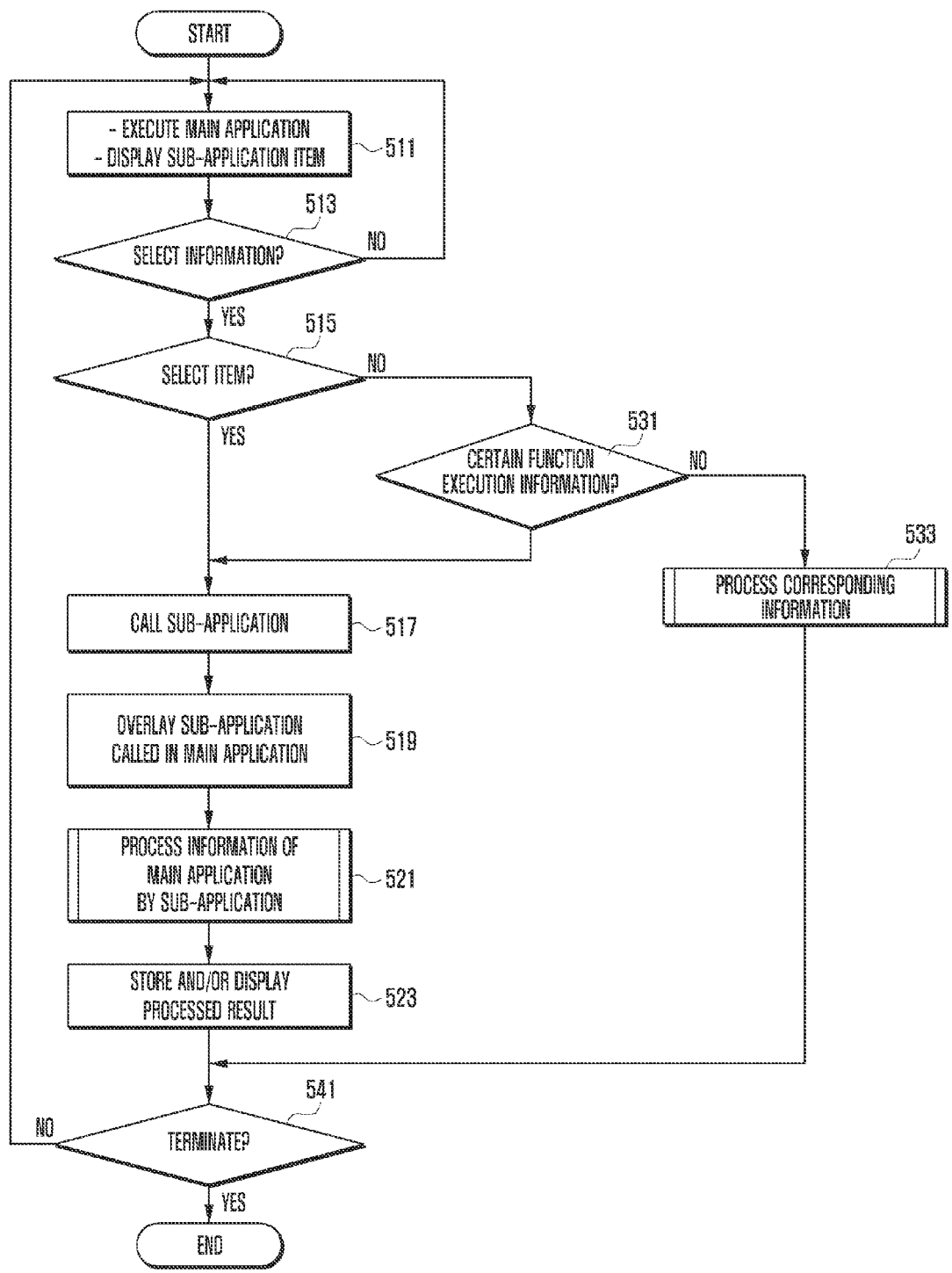
FIG. 5 is a flowchart illustrating a procedure when a sub-application is selected after selecting information of a main application in a portable terminal according to an embodiment of the present disclosure.
Figure 7C:

FIG. 5 is a flowchart illustrating a procedure when a sub-application is selected after selecting information of a main application in a portable terminal according to an embodiment of the present disclosure.

Referring to FIG. 5, at operation 511, the controller 100 executes the selected main application and displays the item of the sub-applications which is the additional function of the main application is displayed along with the main application on the display unit 130.

Thereafter, at operation 513, the controller 100 determines whether the user selects information. For example, if the user selects information of the main application through the first input unit 140 or the second input unit 150, the controller 100 detects the selection.

At operation 515, the controller 100 determines (e.g., examines) whether the item of the displayed sub-application has been selected.

If the controller 100 determines that user selects the sub-application item at operation 515, then the controller 100 proceeds to operation 517 at which the controller 100 calls the sub-application of the selected item.

At operation 519, the controller 100 displays the selected sub-application that is overlaid on the main application on the display unit 130.

Thereafter, at operation 521, the controller 100 processes the information of the main application selected by user through the sub-application of the additional function.

At operation 523, the controller 100 displays and/or stores the processed result of the sub-application.

If the controller 100 determines that the user did not select the item at operation 515, then the controller 100 proceeds to operation 531 at which the controller 100 determines whether the selected information is information for executing a certain function. The information for executing the certain function may be information including the function that executes the certain function by the selected information. For example, when a certain function is selected by selecting certain information in the main application and executing the menu function of the portable terminal (e.g., when a dictionary is selected after selecting a word) or when the selected information is execution information of a certain function (e.g., in the case of hyperlink information).

If the controller 100 determines that the selected information corresponds to information for executing a certain function at operation 531, then the controller 100 proceeds to operation 517 at which the controller 100 automatically calls the sub-application (or toolkit). Thereafter, the controller 100 processes the corresponding information using the selected sub-application while performing the above operations 519 to 523.

In contrast, if the controller 100 determines that selected information does not correspond to information for executing a certain function, then the controller 100 proceeds to operation 533 at which the controller 100 processes a corresponding function. For example, if the controller 100 determines that the item of a certain sub-application is not selected in the main application or the selected information is not information that executes a certain function, the information is processed in the main application.

At this time, when the sub-application performs the linkage operation by being overlaid in the main application as at operation 521, if the controller 100 detects a drag (or scroll) operation in the main application display area through the first input unit 140 and/or the second input unit 150, then the controller 100 scrolls the main application (a vertical or horizontal scroll). Further, if the size of the scrolled page exceeds a preset size, the controller 100 displays the next page or the previous page of the main application in the display unit 130 according to the scrolling direction.

Further, at operation 541, the controller 100 determines whether a termination command of the sub-application is generated. For example, the controller 100 determines whether a termination command of the sub-application is generated while linking and operating the main application and the sub-application.

If the controller 100 determines that a termination command of the sub-application is generated while linking and operating the main application and the sub-application at operation 541, then the controller 100 detects the termination command and terminates the sub-application. If the sub-application is terminated, the controller 100 displays only the screen of the main application on the display unit 130, and at this time, the screen of the main application may be moved in page units by the flick.

In contrast, if the controller 100 determines that a termination command of the sub-application is not generated at operation 541, then the controller 100 proceeds to operation 511.

FIG. 6 illustrates a linkage operation between a main application and a sub-application such as, for example, the main application and the sub-application of FIG. 5 according to an embodiment of the present disclosure. FIGS. 7A to 7F illustrate an operation of each sub-application in a process of performing a procedure such as, for example, the procedure of FIG. 6 according to an embodiment of the present disclosure.

Referring to FIG. 6, at operation 611, the controller 100 determines whether the detected selection corresponds to selection of the note application item.

If the selected item is the note application item at operation 611 (e.g., if the controller 100 determines that the detected selection corresponds to selection of the note application item), then the controller 100 proceeds to operation 613 at which the controller 100 overlays the note application on the main application and displays the selected information in the note application. At this time, when the note application is processed, the selected information of the main application may be copied and pasted, and the data inputted through the input unit 140 and/or 150 may be displayed on the note application screen.

In contrast, if the selected item is not the note application item at operation 611 (e.g., if the controller 100 determines that the detected selection does not correspond to selection of the note application item), then the controller 100 proceeds to operation 621 at which the controller 100 determines whether the detected selection corresponds to selection of a calculator application item.

If the selected item is a calculator application item at operation 621 (e.g., if the controller 100 determines that the detected selection corresponds to selection of the calculator application item), then the controller 100 proceeds to operation 623 at which the controller 100 overlays the calculator application on the main application and displays the selected information on the calculator application screen. At this time, when processing the calculator application, the selected information of the main application selected by user may be copied and pasted, and then the calculator application may calculate the pasted information. Further, data may be inputted through the input unit 140 and/or 150, and in this case, the calculator application may calculate and display the inputted data.

In contrast, if the selected item is not the calculator application item at operation 621 (e.g., if the controller 100 determines that the detected selection does not correspond to selection of the calculator application item), then the controller 100 proceeds to operation 631 at which the controller 100 determines whether the detected selection corresponds to selection of a map application item.

If the selected item is the map application item at operation 631 (e.g., if the controller 100 determines that the detected selection corresponds to selection of the map application item), then the controller 100 proceeds to operation 633 at which the controller 100 overlays the map application screen for displaying the selected information on the main application and displays the selected information on the map application screen. The selected information (e.g., the place name, city, country, and the like) may be one or more sets, and if a plurality of sets of information have been selected, the controller 100 may display a plurality of sets of information on the screen of the map application.

In contrast, if the selected item is not the map application item at operation 631 (e.g., if the controller 100 determines that the detected selection does not correspond to selection of the map application item), then the controller 100 proceeds to operation 641 at which the controller 100 determines whether the detected selection corresponds to selection of a web browser application item.

If the selected item is the web browser application item at operation 641 (e.g., if the controller 100 determines that the detected selection corresponds to selection of the web browser application item), then the controller 100 proceeds to operation 643 at which the controller 100 overlays the web browser application screen on the main application and searches for the selected information on the web. In the web browser application, user may set a certain portable site (e.g., Naver, Google, and the like), and if the web browser application is selected, the controller 100 searches for the selected information of the main application by executing the web browser application of the portable site on the web.

In contrast, if the selected item is not the web browser application item at operation 641 (e.g., if the controller 100 determines that the detected selection does not correspond to selection of the web browser application item), then the controller 100 proceeds to operation 651 at which the controller 100 determines whether the detected selection corresponds to selection of a dictionary application item.

If the selected item is the dictionary application item at operation 651 (e.g., if the controller 100 determines that the detected selection corresponds to selection of the dictionary application item), then the controller 100 proceeds to operation 651 at which the controller 100 overlays the dictionary application screen on the main application and displays the meaning of the selected information stated in the dictionary.

In contrast, if the selected item is not the dictionary application item at operation 651 (e.g., if the controller 100 determines that the detected selection does not correspond to selection of the dictionary application item), then the controller 100 proceeds to operation 661 at which the controller 100 processes selected information by a corresponding sub-application.

Further, at operation 661, if an item other than the sub-application item is selected, the controller 100 processes the selected information of the main application by executing the selected sub-application at operation.

Referring to FIGS. 7A to 7F, the sub-applications (toolkits) according to an embodiment of the present disclosure may be linked with the main application in the following scheme.

As illustrated in FIG. 6, the sub-applications connected to the main application may automatically convert the selected content in a form that is appropriate to the toolkit when copying and pasting (e.g., dragging and dropping) the selected content of the main application. For example, when the certain content is copied from the main application and is pasted on a certain sub-application, the sub-application automatically converts the content into a form that fits the sub-application. For example, if the calculator application and the numerical formula of the main application (e.g., a text viewer application) are selected as in screen 711 of FIG. 7A, the numerical formula is copied from the main application and is pasted on the calculator application, and thus the calculator application calculates the pasted numerical formula as in screen 713 of FIG. 7A. Further, if the numerical object is copied from the textbook viewer, the main application, and is pasted on the note toolkit, the numerical formula is converted into an image in the note application or is converted into data through a character recognition, thereby maintaining the original form of the numerical formula as in screen 715 of FIG. 7C.

If the information selected in the main application includes information that executes a certain function as in operation 531 of FIG. 5, the controller 100 automatically calls the sub-application (e.g., the corresponding toolkit) corresponding to the function. For example, if a certain function linked with the toolkit is executed in the main application in an embodiment of the present disclosure, the controller 100 automatically calls the related toolkit even when the toolkit is closed or another toolkit is being used. For example, when the main application is the e-book viewer, if user selects a certain text in the e-book viewer and pushes button "dictionary" in the contextual menu as shown in screen 721 of FIG. 7B, the controller 100 automatically calls the dictionary toolkit and shows a result of a dictionary search for the text as in screen 723 of FIG. 7B. At this time, if another toolkit is being used, the controller 100 closes the toolkit under use, and opens the dictionary toolkit. According to various embodiments, if another toolkit is being used when the dictionary toolkit is selected, then the controller 100 may open the dictionary toolkit so that it is operated concurrently with the other toolkit being used at the time of selection of the dictionary toolkit.

Further, even when the hyperlink information is selected within the main application, the same operation occurs. For example, when the web hyperlink is selected within the main application, the controller 100 may check the page linked with the main application by calling the web browser toolkit. Further, when the map hyperlink on the location of the map is pushed, the location is displayed by calling the map toolkit. For example, when the selected term "empire" is a hyperlink term as in screen 731 of FIG. 7C, the controller 100 may call a web browser toolkit and display the web search result of the selected term "empire" as in screen 733 of FIG. 7C. Further, when the selected term "Rome" is a map hyperlink term as in screen 741 of FIG. 7D, the controller 100 may call a map toolkit and display the location of Rome as in screen 743 of FIG. 7D.

If the information selected in the main application is processed in the sub-application, the sub-application may recognize the content of certain conditions in the main application and display the content in the toolkit. For example, the sub-application may recognize the content being displayed on the main application and collect and display only the contents that fit certain conditions in the toolkit. For example, if there are a plurality of place name information sets (e.g., assuming that the sets are Rome, Venezia and Firenze) in the content within the main application in a state in which the map application is opened as in screen 751 of FIG. 7E, the controller 100 collects and shows the place name information sets on the map toolkit as in screen 753 of FIG. 7E.

In an embodiment of the present disclosure, information may be exchanged between sub-applications (e.g., toolkits). For example, when there are a plurality of toolkits, the controller 100 may exchange information between toolkits. For example, when each sub-application includes the add-to-note item, the result processed in each sub-application may be processed and stored in the note application. For example, if the calculation is performed in the calculator toolkit and "Add to Note" button is pushed, the controller 100 may paste the currently calculated numerical formula and result value on the last part of the last page of the note in the note toolkit. This Add to Note function may also be used in the map toolkit and the web browser toolkit, and in such a case, the controller 100 may easily paste the information displayed on the toolkit on the note toolkit. FIG. 7F illustrates an example in which an Add to Note function of the web browser toolkit is performed. In the case of FIG. 7F, if user calls note application in the web application as in screen 761 of FIG. 7F (Add to Note is selected), the controller 100 detects selection of the note application, calls the note application, and displays the information (including URL information of the web) displayed in the web application in the called note application screen as in screen 763 of FIG. 7F. The displayed information may be image information, and the information may be converted into data through the character recognition procedure when necessary. When the note application is selected in a state in which an arbitrary sub-application is performed, the controller 100 may call the note application and copy the information of the sub-application.

FIG. 5 illustrates a procedure in which the user selects information from a main application, then selects a desired sub-application, and the selected sub-application processes selected information of the main application. However, in an embodiment of the present disclosure, the user may select a sub-application and then select desired information in the main application, and may select information of the main application and then select the sub-application as in FIG. 5.

Figure 8:
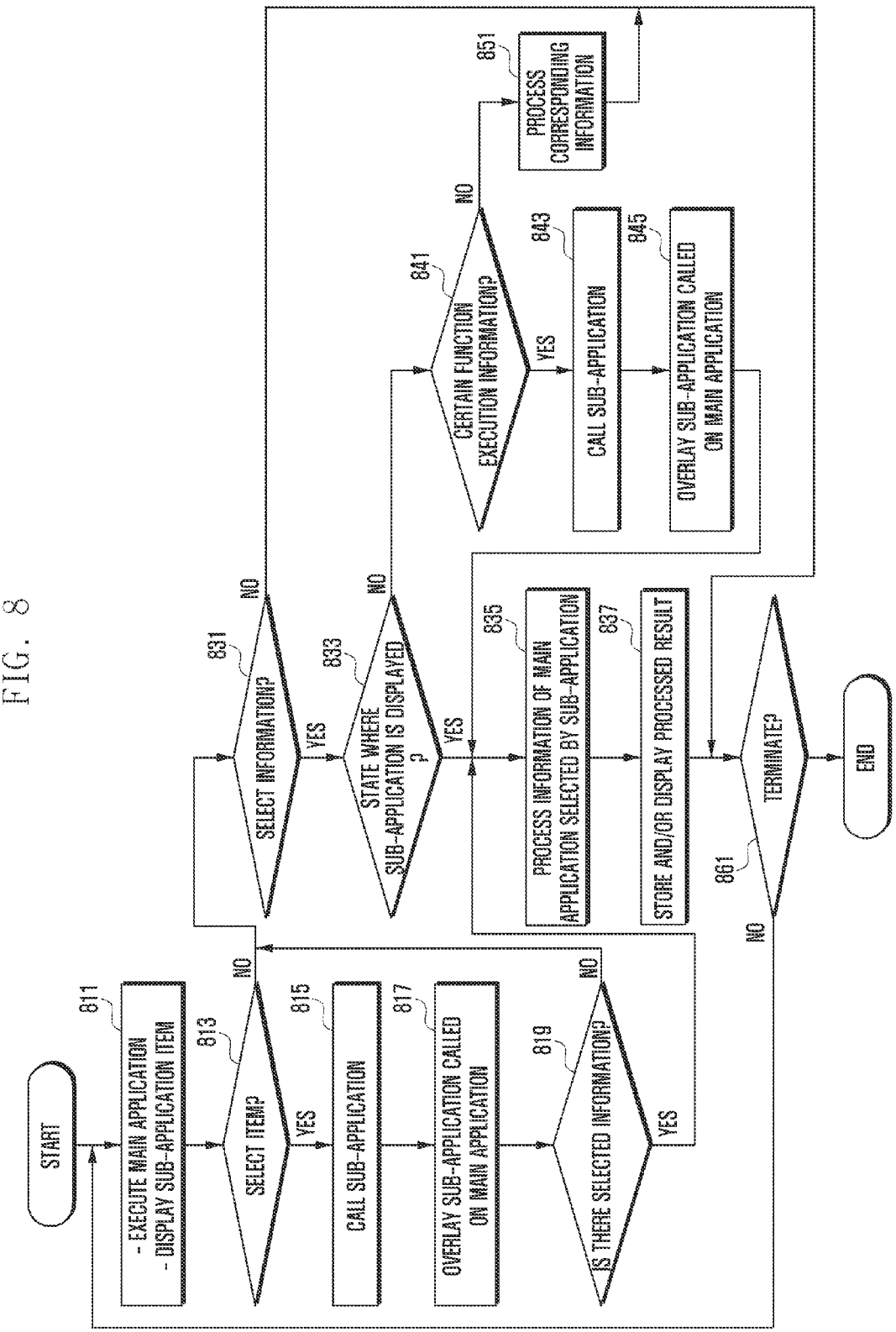
FIG. 8 is a flowchart illustrating an operation procedure when selecting a sub-application after selecting information of a main application or executing the sub-application by selecting information after selecting the sub-application from the main application in a portable terminal according to an embodiment of the present disclosure.

FIG. 8 is a flowchart illustrating an operation procedure when selecting a sub-application after selecting information of a main application or executing the sub-application information after selecting the sub-application in the main application in a portable terminal according to an embodiment of the present disclosure.

Referring to FIG. 8, at operation 811, the controller 100 executes the main application selected. The item of the sub-applications, which are the additional function of the main application, is displayed in the display unit 130 along with the main application.

Thereafter, at operation 813, the controller 100 determines whether the user selects an item of the sub-application on the screen of the main application. For example, the controller 100 determines whether the user selects an item of the sub-application on the screen of the main application through the first input unit 140 or the second input unit 150.

If the controller 100 determines that the user selects the item of the sub-application displayed on the screen of the main application through the first input unit 140 or the second input unit 150 at operation 813, then the controller 100 the detects item selected and thereafter proceeds to operation 815.

At operation 815, the controller 100 calls the sub-application of the selected item.

Thereafter, at operation 817, the controller 100 overlays the sub-application on the main application displayed on the display unit 130.

At operation 819, the controller 100 determines whether information of the main application has been selected.

In a state where the sub-application is called, if the controller 100 determines that the information of the main application has been selected at operation 819, then the controller 100 proceeds to operation 835.

In contrast, if the controller determines that the information of the main application has not been selected at operation 819, then the controller 100 proceeds to operation 831.

At operation 831, the controller 100 determines whether information is selected.

If the controller 100 determines that information is not selected at operation 831, then the controller 100 proceeds to operation 861.

At operation 833, the controller 100 determines whether information is selected in a state in which the sub-application is displayed.

If the controller 100 determines that the information is selected in a state in which the sub-application is not displayed at operation 833, then the controller 100 proceeds to operation 841.

In contrast, if the controller 100 determines that the information is selected in a state in which the sub-application is displayed at operation 833, then the controller 100 proceeds to operation 835.

At operation 835, the controller 100 processes the selected information of the main application through the sub-application of the additional function.

At operation 837, the controller 100 displays and/or stores the processed result of the sub-application. Thereafter, the controller 100 proceeds to operation 861, Hereinafter, the procedure of selecting the information of the main application and then selecting the sub-application is described.

As discussed above, at operation 831, the controller 100 determines whether information is selected. If the information of the main application is selected, the controller 100 detects the selection at operation 831.

At operation 833, the controller determines whether the sub-application has been selected. For example, the controller 100 determines whether information is selected in a state in which the sub-application is displayed.

If the controller 100 determines that the information is selected in a state in which the sub-application is not displayed at operation 833, then the controller 100 proceeds to operation 841.

At operation 841, the controller determines whether the selected information is information for executing a certain function. The information for executing the certain function may be information including the function that executes the certain function by the selected information. For example, when a certain function is selected by selecting certain information in the main application and executing the menu function of the portable terminal (e.g., when a dictionary is selected after selecting a word) or when the selected information is execution information of a certain function (e.g., in the case of hyperlink information).

If the controller 100 determines that the selected information is not information for executing a certain function at operation 841, then the controller 100 proceeds to operation 851 at which the processes corresponding information. Thereafter, the controller 100 proceeds to operation 861 at which the controller 100 determines whether to terminate the process, and if the controller determines not to terminate the process, the controller 100 proceeds to operation 811 at which the controller waits for the item selection of the sub-application.

In contrast, if the controller 100 determines that the selected information is information for executing a certain function at operation 841, then the controller 100 proceeds to operation 843.

If the item of the sub-application has been selected at operation 841, then the controller 100 detects the selection, and at operation 843, the controller 100 calls the sub-application of the selected item.

Thereafter, at operation 845, the controller 100 overlays the sub-application on the main application. Thereafter, the controller 100 proceeds to operation 835.

For example, the controller 100 detects that there is the selected information of the main application.

At operation 835, the controller 100 processes the selected information of the main application through the sub-application of the additional function.

At operation 837, the controller 100 displays and/or stores the processed result.

If the information selected in the main application is information having a function that may call the sub-application, the controller 100 detects that the selected information is execution information of a certain function at operation 841, calls the corresponding sub-application for processing information at operation 843, and overlays the called sub-application on the screen of the main application at operation 845. Thereafter, the controller 100 processes the selected information of the main application through the sub-application of the additional function, and displays and/or stores the processed result while performing operations 835 and 837.

Further, at operation 861, the controller 100 determines whether to terminate the process. If the termination command of the sub-application occurs while the main application and the sub-application are linked and operated, the controller 100 detects the command and terminates the sub-application at operation 861. If the sub-application is terminated, the controller 100 displays only the screen of the main application on the display unit 130, and may move the screen of the main application in page units by a flick.

Likewise, the main application screen according to an embodiment of the present disclosure displays items of sub-applications of the additional function that may be used in the application as illustrated in FIG. 2A. At this time, the sub-application of the additional function may be called by user's selection while executing the main application, and the called sub-application processes the information selected in the main application according to the direction of the sub-application. The main application may have various application types as shown in screen 320 of FIG. 3A. Hence, the main application may preferably select appropriate toolkits according to the characteristics and provide the selected toolkit set. For example, when the main application is a science education application, the note/calculator/web toolkit may be set as a toolkit set, and when the main application is a language education application, the note/dictionary/web toolkit may be set as a web toolkit. Further, the toolkit set of the main application may make the configuration of an arbitrary toolkit set by user's customization possible.

Figure 9:
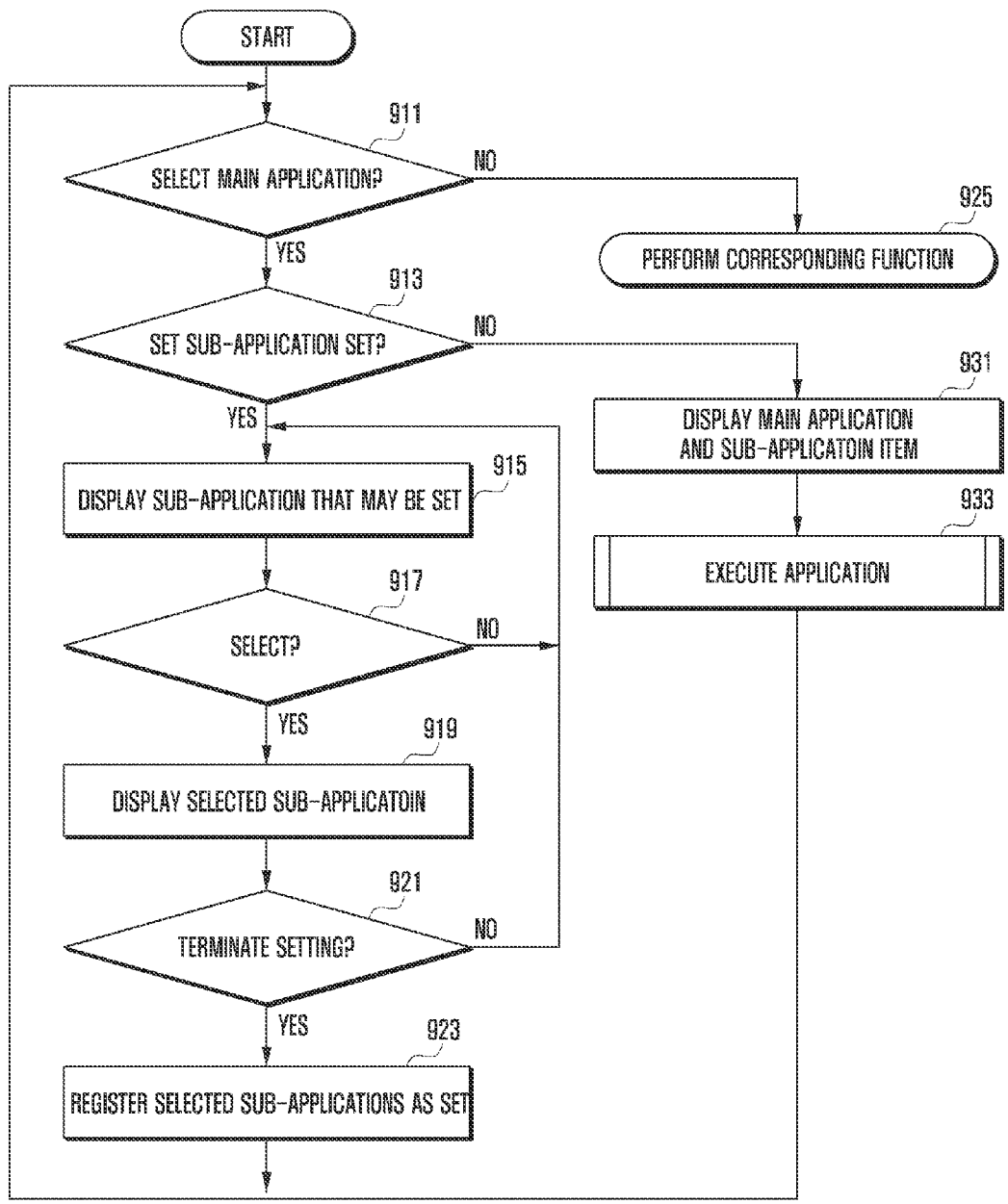
FIG. 9 is a flowchart illustrating a procedure of setting a sub-application of a main application according to an embodiment of the present disclosure.

FIG. 9 is a flowchart illustrating a procedure of setting a sub-application of a main application according to an embodiment of the present disclosure. FIGS. 10A to 10D illustrate an example of setting a sub-application set by a procedure, such as, for example, the procedure as in FIG. 9 according to an embodiment of the present disclosure.

Referring to FIG. 9 and FIGS. 10A to 10D, at operation 911, the controller 100 determines whether a main application is selected.

If the controller 100 determines that a main application is not selected at operation 911, then the controller 100 proceeds to operation 925 at which the controller 100 performs a corresponding function.

Figure 10A:
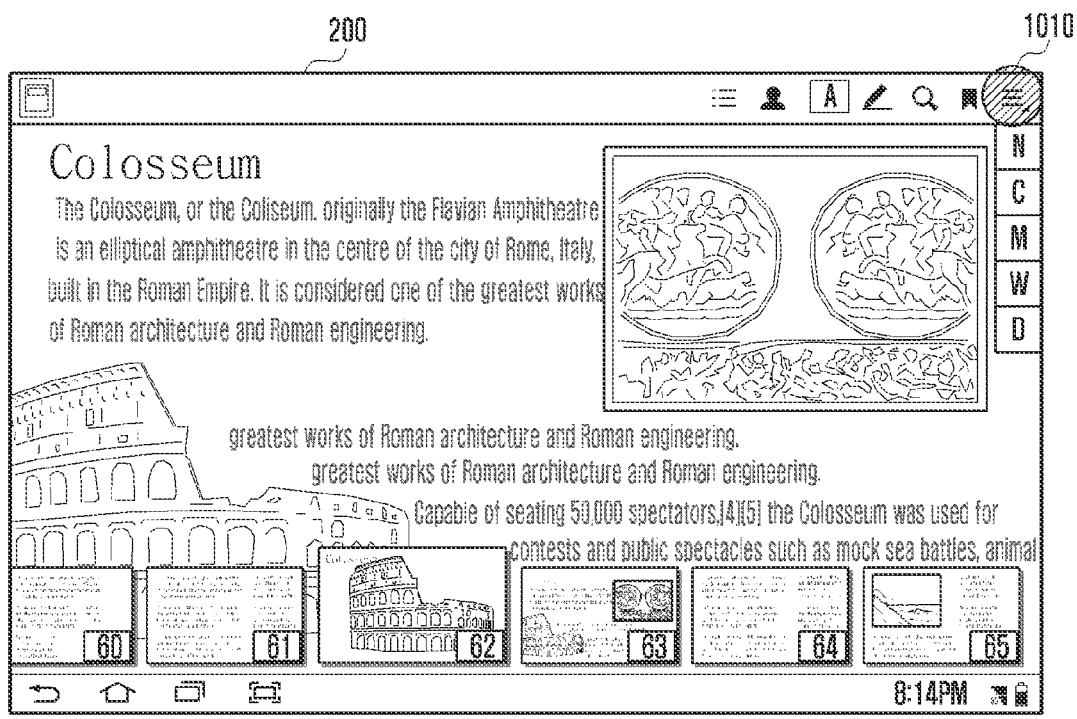
FIGS. 10A to 10D illustrate an example of setting a sub-application set by a procedure, such as, for example, the procedure as in FIG. 9, according to an embodiment of the present disclosure.

If the controller 100 determines that a main application is selected at operation 911, then the controller 100 detects the selection and displays the screen of the main application 200 as in FIG. 10A. Thereafter, the controller 100 proceeds to operation 913.

At this time, a setting item 1010 is displayed on the screen of the main application. At operation 913, the controller 100 determines whether the user selects the setting item.

If the controller determines that the user selects the setting item at operation 913, the controller 100 detects the selection and proceeds to operation 915.

Figure 10B:
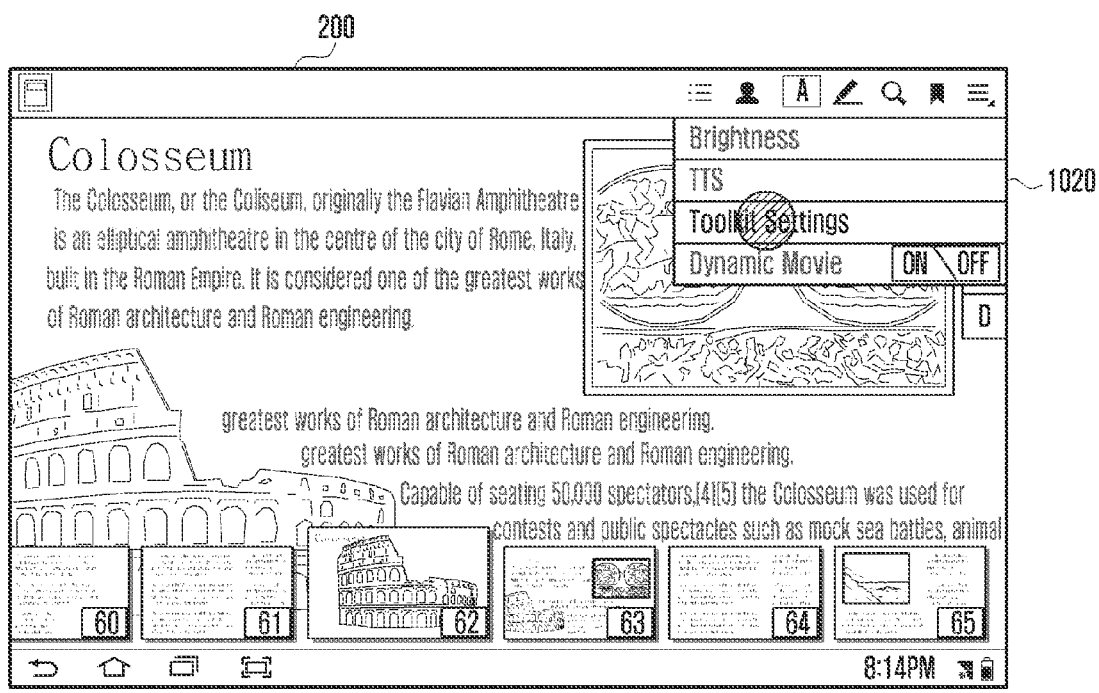

At operation 915, the controller 100 displays a setting menu 1020 of FIG. 10B. The setting menu 1020 includes a sub-application setting menu (toolkit settings).

Figure 10C:
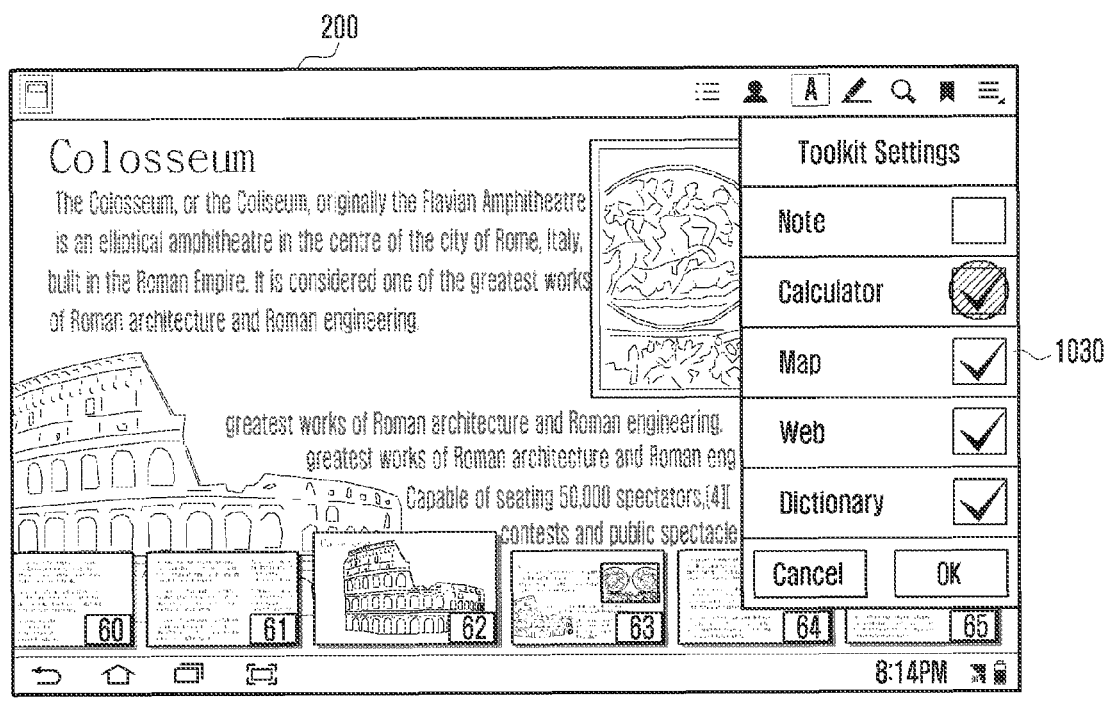
Figure 10D:
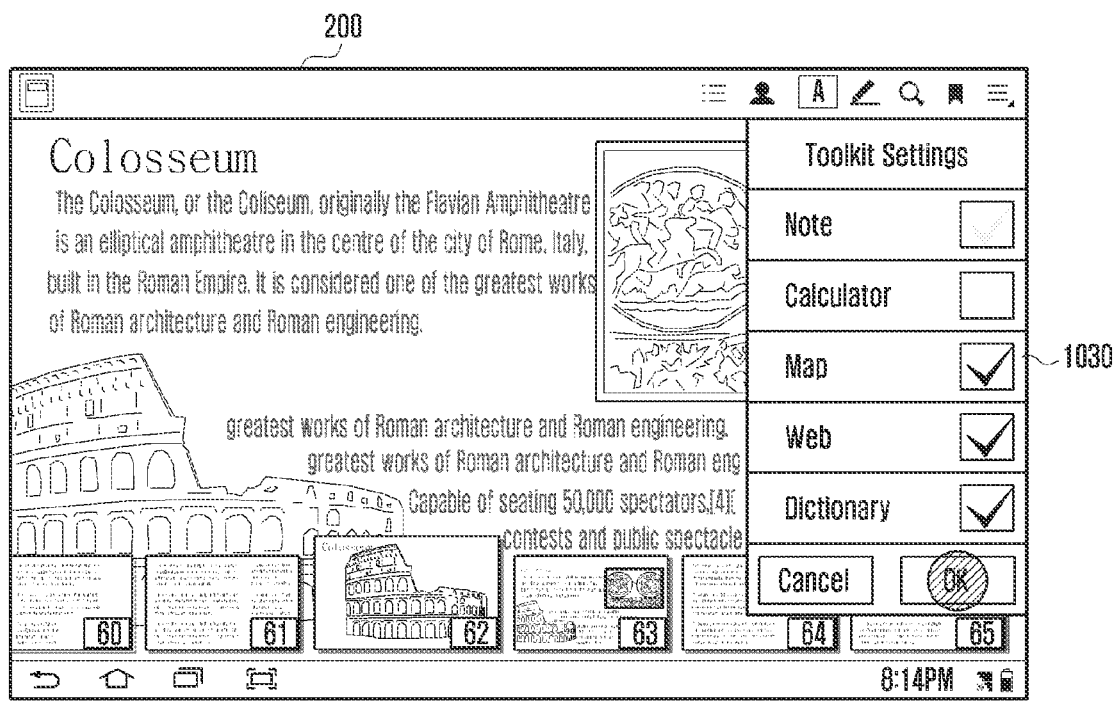

At this time, if user selects the setting menu of the sub-application of the setting menu 1020, then at operation 915, the controller 100 displays sub-application items that may be set as in screen 1030 of FIG. 10C.

At operation 917, the controller determines whether the user selects a check box of the sub-application setting item. For example, the controller determines whether the user selects a check box of the sub-application setting item for the sub-application setting menu.

If the controller determines that user selects the check box of the sub-application setting item at operation 917, the controller 100 detects the selection and proceeds to operation 919.

At operation 919, the check box of the sub-application is checked as in FIG. 10C. For example, the controller 100 may display the sub application as selected. The sub-application for being linked with the currently displayed main application may be set while repeating the same operation, and when the setting is completed, user may click on the OK button of the setting menu as in FIG. 10D.

At operation 921, the controller 100 determines whether to terminate the setting of the sub-application. For example, the controller 100 may detect the setting termination of the sub-application.

If the controller 100 determines to terminate the setting of the sub-application at operation 821, then the controller 100 proceeds to operation 915.

If the controller 100 determines to terminate the setting of the sub-application at operation 821, then the controller 100 proceeds to operation 923 at which the controller 100 registers the selected sub-applications as the sub-application toolkit set of the main application.

After the sub application set of the main application is set, if the main application is operated. For example, after the sub application is set of the main application is set, the controller 100 may return to operation 911 at which the controller 100 may detect an operation If the controller 100 determines that the user has not selected the setting item (e.g., if the sub-application is set) at operation 913, the controller 100 may proceed to operation 931 at which the controller 100 may display the main application and the sub-application set as in FIG. 2A.

Further, if the main application is executed, at operation 933, the controller 100 may process the information of the main application by the selected sub-application while performing a procedure as in FIG. 5 or FIG. 8.

The present disclosure may provide additionally needed functions as a form of a toolkit in a situation where functions of various applications need to be compositively used at the same time, and thus user may effectively use the additional functions while focusing on the main application (main task). For example, the present disclosure provides a toolkit framework that makes the linkage between the main application and the sub-application of the additional function easy, and makes various additional functions in the toolkit frame work as a tool kit so that the functions may be added on various applications. Further, the content of the main application is linked with the additional function of the sub-application, and thus the data exchange procedure between applications, such as the copying and pasting of the content and execution of the function, may be significantly simplified.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method of processing an application in a portable terminal, the method comprising:
   displaying a main application screen including information and a sub-application set;
   detecting selection of the information within the displayed main application screen;
   detecting selection of at least one sub-application item from the sub-application set within the displayed main application screen; and executing a sub-application corresponding to the selected at least one sub-application item and displaying a screen of the sub-application including the selected information so as to overlay on a partial area of the main application screen in response to the selection of the information and the at least one sub-application item.

2. The method of claim 1,
wherein the sub-application set includes at least one sub-application, and
wherein the sub-application set is commonly set in a plurality of main applications.

3. The method of claim 2,
wherein the at least one sub-application item corresponds to sub-application items of the sub-application set displayed within the main application screen, and
wherein the sub-application items are displayed in a tab form.

4. The method of claim 3, wherein the sub-application is executed by one of touching or dragging the at least one sub-application item of the sub-application of the tab form.

5. The method of claim 4, wherein the sub-application set includes at least one of a note application, a calculator application, a web application, a dictionary application, or a map application.

6. The method of claim 2, further comprising:
copying additional information from the main application screen;
pasting the copied additional information in the selected at least one sub-application; and
processing the additional information pasted by the selected at least one sub-application.

7. The method of claim 6, further comprising:
moving the main application screen in a corresponding direction if one of a drag input or a scroll input is detected in a main application screen area when the sub-application screen is overlaid and displayed on the partial area of the main application screen.

8. The method of claim 7, further comprising:
moving a page of the main application screen if the screen movement of the main application screen exceeds a predetermined size.

9. The method of claim 7, further comprising:
moving a page of the main application screen when a flick input is generated in a process of displaying the main application screen and the at least one sub-application item.

10. The method of claim 2, further comprising:
displaying the at least one sub-application item when selecting a setting menu from the main application screen;
displaying an indication as to which of the at least one sub-application item is selected; and
setting the sub-application as the sub-application set and registering the sub-application in a main application when terminating the setting.

11. A method of processing an application of a portable terminal, the method comprising:
displaying a main application screen including information and a plurality of sub-application items;
detecting selection of the information within the displayed main application screen;
detecting selection of at least one sub-application from the plurality of sub-application items within the displayed main application screen;
executing a sub-application corresponding to the selected at least one sub-application item and displaying a screen of the sub-application including the selected information so as to overlay on a partial area of the main application screen in response to the selection of the information and the at least one sub-application item; and
returning to an operation of displaying the main application screen including the information and the plurality of sub-application items when the sub-application is terminated.

12. The method of claim 11, further comprising:
copying additional information from the main application screen;
pasting the copied additional information on the selected at least one sub-application; and
processing the additional information pasted by the selected at least one sub-application.

13. The method of claim 12, wherein sub-applications corresponding to the displayed plurality of sub-application items include at least one of a note application, a calculator application, a web application, a dictionary application, or a map application.

14. The method of claim 13, wherein the executing of the sub-application and the displaying of the sub-application screen so as to overlay on the partial area of the main application screen are performed if the information selected from the main application screen is information having an application calling function.

15. The method of claim 13, wherein the sub-applications corresponding to the displayed plurality of sub-application items include a note application item, and information of the sub-application is copied to the note application when the note application item is selected.

16. The method of claim 13, further comprising:
moving the main application screen in a corresponding direction if one of a drag input or a scroll input is detected in a main application screen area when the sub-application screen is overlaid and displayed on the partial area of the main application screen.

17. An apparatus for processing an application in a portable terminal, the apparatus comprising:
a memory configured to store a main application and a sub-application set corresponding to the main application;
a display configured to display a main application screen including a plurality of sub-application items which are set in the sub-application set of the main application;
an input device configured to select at least one sub-application item among the plurality of sub-application items; and
at least one processor executing instructions stored in the memory is configured to:
receive selected information within the displayed main application screen,
receive selected at least one sub-application item from the sub-application set within the displayed main application screen, and
execute a sub-application corresponding to the selected at least one sub-application item and display a screen of the sub-application including the selected information so as to overlay on a partial area of the main application screen in response to the selection of the information and the at least one sub-application item.

18. The apparatus of claim 17, wherein sub-applications corresponding to the displayed plurality of sub-application items include at least one of a note application, a calculator application, a web application, a dictionary application, or a map application.

19. The apparatus of claim 18, wherein the at least one processor is further configured to move the main application screen in a corresponding direction if one of a drag input or a scroll input is detected in a main application screen area through the input device when the sub-application screen is displayed so as to be overlaid on the partial area of the main application screen.

* * * * *